(12) United States Patent
Loh et al.

(10) Patent No.: US 9,272,910 B2
(45) Date of Patent: Mar. 1, 2016

(54) METHODS OF NONDESTRUCTIVELY DELAMINATING GRAPHENE FROM A METAL SUBSTRATE

(75) Inventors: Kian Ping Loh, Singapore (SG); Yu Wang, Singapore (SG)

(73) Assignee: National University of Singapore, Singapore (SG)

( * ) Notice: Subject to any disclaimer, the term of this patent is extended or adjusted under 35 U.S.C. 154(b) by 28 days.

(21) Appl. No.: 14/344,040

(22) PCT Filed: Sep. 4, 2012

(86) PCT No.: PCT/SG2012/000318
§ 371 (c)(1),
(2), (4) Date: Mar. 10, 2014

(87) PCT Pub. No.: WO2013/043120
PCT Pub. Date: Mar. 28, 2013

(65) Prior Publication Data
US 2014/0231270 A1   Aug. 21, 2014

Related U.S. Application Data

(60) Provisional application No. 61/537,118, filed on Sep. 21, 2011.

(51) Int. Cl.
| | |
|---|---|
| *C25F 5/00* | (2006.01) |
| *C01B 31/04* | (2006.01) |
| *B82Y 30/00* | (2011.01) |
| *B82Y 40/00* | (2011.01) |

(52) U.S. Cl.
CPC ............ *C01B 31/0453* (2013.01); *B82Y 30/00* (2013.01); *B82Y 40/00* (2013.01); *C01B 31/0469* (2013.01); *C01B 31/0484* (2013.01); *C25F 5/00* (2013.01); *Y02E 60/366* (2013.01)

(58) Field of Classification Search
CPC ............ C01B 31/0453; C01B 31/0469; C01B 31/0484; C25F 5/00
USPC ........................................................ 205/640
See application file for complete search history.

(56) References Cited

U.S. PATENT DOCUMENTS

| | | | |
|---|---|---|---|
| 9,039,886 B2 * | 5/2015 | Gong ....................... | B32B 38/10 156/153 |
| 2011/0070146 A1 * | 3/2011 | Song ...................... | B82Y 30/00 423/448 |

FOREIGN PATENT DOCUMENTS

CN   WO 2012167738 A1 *  12/2012   ................ C25B 1/00

* cited by examiner

*Primary Examiner* — Nicholas A Smith
(74) *Attorney, Agent, or Firm* — Cesari and McKenna LLP

(57) ABSTRACT

Methods of delaminating a graphene film (60) from a metal substrate (50) are disclosed that substantially preserve the metal substrate. The methods include forming a support layer (80) on the graphene film and then performing an electrochemical process in an electrochemical apparatus (10). The electrochemical process creates gas bubbles (36) at the metal-film interface (64), thereby causing the delamination. The graphene film and support layer form a structure (86) that is collected by a take-up roller (120). The support layer and graphene structure are then separated to obtain the graphene film.

24 Claims, 8 Drawing Sheets

METHODS OF NONDESTRUCTIVELY DELAMINATING GRAPHENE FROM A METAL SUBSTRATE

CROSS-REFERENCE TO RELATED APPLICATIONS

This application is the National Stage of International Application No. PCT/SG2012/000318 filed on Sep. 4, 2012, which claims the benefit of U.S. Provisional Application No. 61/537,118 filed on Sep. 21, 2011. The contents of both applications are hereby incorporated by reference in their entirety.

CLAIM OF PRIORITY

This application claims priority from U.S. Provisional Patent Application Ser. No. 61/537,118, filed on Sep. 21, 2011, which is incorporated by reference herein.

FIELD

This disclosure relates generally to methods of producing graphene, and in particular to methods of nondestructive delamination of graphene formed on a metal substrate.

BACKGROUND ART

Graphene is a one-atom-thick allotrope of carbon with a $sp^2$-hybridized honeycomb, two-dimensional, carbon lattice consisting of conjugated hexagonal cells. Graphene has garnered much attention due to its unique band structure and its structural, electrical and optical properties. Prototype devices employing graphene, such as high-frequency field-effect transistors (FETs), photo-voltaic systems (solar cells), chemical sensors, super-capacitors, etc., have demonstrated the potential uses for graphene in electronics and optoelectronics devices. An overview of graphene is set forth in the article by A. K. Geim and K. S. Novoselov entitled "The rise of graphene," *Nature Materials* 6, no. 3 (2007): 183-191.

Large-area, high-quality graphene films formed using chemical vapor deposition (CVD) methods are desirable because of their high strength, flexibility, transparency and conductivity. While a number of methods have been developed to transfer graphene onto other substrates for subsequent use, all involve detaching the graphene from the metal substrate (usually copper) by etching away the metal and dissolving the substrate completely in solution. The etching and subsequent destruction of the metal substrate is not only costly but also complicated by the use of copious quantities of chemical bath. Moreover, the subsequent recovery of the metal from the chemical bath takes energy and adds cost and complexity to the graphene-forming process.

SUMMARY

The present disclosure is directed to methods of obtaining graphene in the form of a graphene film that resides on a metal substrate, wherein the metal substrate serves as a catalyst for graphene formation. The method uses a nondestructive delamination process that separates the graphene film from the metal substrate by an electrochemical process that can be carried out in an electrochemical apparatus such as described hereinbelow. The metal substrate can be made of any number of suitable metals, with copper (Cu), nickel (Ni), platinum (Pt) and Iridium (Ir) being exemplary choices.

Advantages of the methods include: (i) the metal substrates can be re-used (recycled) for multiple cycles, i.e., they can be used multiple times to carry out the graphene delamination methods, with the advantage that pre-used (recycled) metal substrates tend to produce higher-quality graphene due to a natural planarization process inherent in the method; (ii) the methods are more efficient and cost-effective than previous methods wherein the metal substrate is damaged or consumed; (iii) the methods can be integrated with industrial-scale "roll-and-release" film-transfer techniques; (iv) the methods can be used to remove microscale-patterned graphene from a metal substrate; and (v) the methods can include forming functionalized graphene through the use of nanocrystals and nanoparticles.

Examples of nanocrystals and nanoparticles include metals such as Au, Ag, Cu, Pd, Ru, Rh and Ir; metal oxides such as $Fe_2O_3$, $Cu_2O$, $Mn_3O_4$, $TiO_2$, CoO, MnO, NiO, CdO, CuO, ZnO, $ReO_3$, $Ga_2O_3$ and $In_2O_3$; metal chalcogenide such as CdS, CdSe, CdTe, PbS, PbSe, ZnS, MnS, PbTe and ($ME_2$ where, M=Fe, Co, Ni, Mo and E=S or Se); and metal pnictides such as GaN, AlN, InN, BN, TiN, NbN, GeSb, InSb, InAs, InP, and GaP.

An aspect of the disclosure is a method of removing a graphene film grown on a surface of a metal substrate. The method includes applying a support layer to an exposed surface of the graphene film to define a first structure having a graphene-metal interface. The method also includes subjecting the first structure to an electrochemical process that forms gas bubbles at the graphene-metal interface, thereby causing the graphene and support layer to separate from the surface of the metal substrate as a second structure while substantially preserving the metal substrate. The method additionally includes processing the second structure to remove the support layer from the graphene film.

Another aspect of the disclosure is the method as described above, and further including forming the graphene film on the surface of the metal substrate using a chemical vapor deposition process.

Another aspect of the disclosure is the method as described above, wherein the metal substrate is made of either copper (Cu), nickel (Ni), platinum (Pt) or Iridium (Ir).

Another aspect of the disclosure is the method as described above, and further comprising collecting the second structure using a take-up roller.

Another aspect of the disclosure is the method as described above, wherein the metal substrate has previously been subjected to the electrochemical process.

Another aspect of the disclosure is the method as described above and further including: immersing the first structure in an electrolytic solution; using the metal substrate as a cathode that is paired with an anode that is also immersed in the electrolytic solution; and; providing an electrical potential between the cathode and the anode to effectuate the electrochemical process.

Another aspect of the disclosure is the method as described above, wherein the electrolyte solution includes an acid solution, an alkaline solution, a neutral inorganic solution, an organic salt solution, a combined neutral inorganic and organic salt solution, or a conducting green solvent solution.

Another aspect of the disclosure is the method as described above, wherein the electrolytic solution includes nanoparticles or nanocrystals.

Another aspect of the disclosure is the method as described above, and further including: applying the second structure to a process substrate; and removing the support layer from the graphene film of the second structure, thereby leaving the graphene film on the process substrate.

Another aspect of the disclosure is the method as described above, and further including heating the second structure after it is applied to the process substrate.

Another aspect of the disclosure is the method as described above, wherein the support layer is formed from a polymer, a metal or a non-metal.

Another aspect of the disclosure is the method as described above, wherein the metal consists of copper and the support layer consists of poly (methyl methacrylate) (PMMA).

Another aspect of the disclosure is a method of removing a first graphene film from a first surface of a metal substrate on which the first graphene film has been formed. The method includes: a) adding a first support layer to the first graphene film to form a first structure having an interface between the first graphene film and the first surface of the metal substrate; b) immersing at least a portion of the first structure in an electrolytic solution while using the first structure as a cathode, and including employing an anode in the electrolytic solution; and c) performing an electrochemical reaction by establishing an electrical potential between the anode and cathode through the electrolytic solution to cause the first graphene film and the first support layer to delaminate as a second structure from the first surface of the metal substrate while substantially preserving the metal substrate.

Another aspect of the disclosure is the method as described above, wherein the electrolytic solution includes water and wherein the electrochemical reaction causes gas bubbles from the electrolysis of water to be generated at the interface, thereby causing said delamination of the second structure from the first structure.

Another aspect of the disclosure is the method as described above, wherein the metal substrate has a second surface and the first structure includes a second graphene film on the second surface, and including a second support layer on the second graphene film to define another second structure, and wherein the electrochemical reaction delaminates both of the second structures from the metal substrate.

Another aspect of the disclosure is the method as described above, further comprising collecting the second structure using a roll-and-release process.

Another aspect of the disclosure is the method as described above and further including: applying the second structure to a process substrate; and removing the first support layer from the first graphene film of the second structure, thereby leaving the first graphene film on the process substrate.

Another aspect of the disclosure is the method as described above, and further including: recovering the metal substrate; forming another first graphene film on the first surface of the recovered metal substrate; and performing the aforementioned acts a) through c) on the another first graphene film and the recovered metal substrate.

Another aspect of the disclosure is the method as described above, where the first support layer is formed from a polymer, a metal or a non-metal.

Another aspect of the disclosure is the method as described above, wherein the electrolytic solution comprises an acid solution, an alkaline solution, a neutral inorganic solution, an organic salt solution, a combined neutral inorganic and organic salt solution, or a conducting green solvent solution.

Another aspect of the disclosure is the method as described above, wherein the metal substrate is made of copper, and wherein the electrolytic solution includes $K_2S_2O_8$.

Another aspect of the disclosure is the method as described above, wherein the metal substrate comprises a thin metallic foil.

Another aspect of the disclosure is the method as described above, further comprising forming the first graphene film on the first surface of the metal substrate using a chemical vapor deposition process.

Another aspect of the disclosure is the method as described above, wherein the first support layer comprises either a thermal release tap or polydimethylsiloxane (PDMS).

Additional features and advantages of the disclosure will be set forth in the detailed description that follows, and in part will be readily apparent to those skilled in the art from that description or recognized by practicing the disclosure as described herein, including the detailed description that follows, the claims, and the appended drawings.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification.

The claims as set forth below are incorporated into and constitute a part of the Detailed Description as presented below.

BRIEF DESCRIPTION OF THE DRAWINGS

The drawings illustrate various embodiments of the disclosure, and together with the description serve to explain the principles and operations of the disclosure, wherein.

DETAILED DESCRIPTION

Aspects of the disclosure are directed to methods of forming graphene, and in particular to methods of recovering a graphene film by employing a non-destructive method to separate the graphene film from a metal substrate by an electrochemical-assisted separation process. This process is referred to synonymously as exfoliation, peeling, delamination or separation.

The metal substrate can be made of any suitable metal, with copper (Cu), nickel (Ni), platinum (Pt) and Iridium (Ir) being exemplary metals. Advantages of the methods include: (i) the metal substrates can be re-used (recycled) for multiple cycles, i.e., they can be used multiple times when carrying out the methods for different graphene films, with the advantage that pre-used (recycled) metal substrates tend to produce higher-quality graphene due to a natural planarization process inherent in the method; (ii) the methods are more efficient and cost-effective than previous methods wherein the metal substrate is damaged or consumed; (iii) the methods can be integrated with industrial-scale "roll-and-release" film-transfer techniques; (iv) the methods can be used to remove microscale-patterned graphene from a metal substrate; and (v) the methods can include forming functionalized graphene through the use of nanocrystals and nanoparticles.

The methods allow for peeling the graphene film from the metal substrate while substantially preserving the metal substrate. In contrast to conventional etching-based processes where the metal substrate is damaged if not entirely dissolved, the methods disclosed herein provide for the graphene film to remain substantially intact post-peeling or after exfoliation from the substrate, while substantially preserving the metal substrate. In an example, the surface of the metal substrate is improved for repeat cycles of the exfoliation process so that subsequent graphene films are of better quality than previous graphene films.

The methods disclosed herein allow the graphene film to gently peel off (i.e., exfoliate, separate, delaminate, etc.) from the metal substrate through a superficial electrochemical corrosion process that occurs at the interface of the deposited graphene film and the metal substrate surface. The superficially corroded metal is redeposited under cathodic conditions, thereby producing a planarized surface on the metal substrate. This process occurs with minimal (i.e., insubstantial) destruction of the metal substrate and actually improves the morphology of the graphene film grown thereon.

Figure 1:
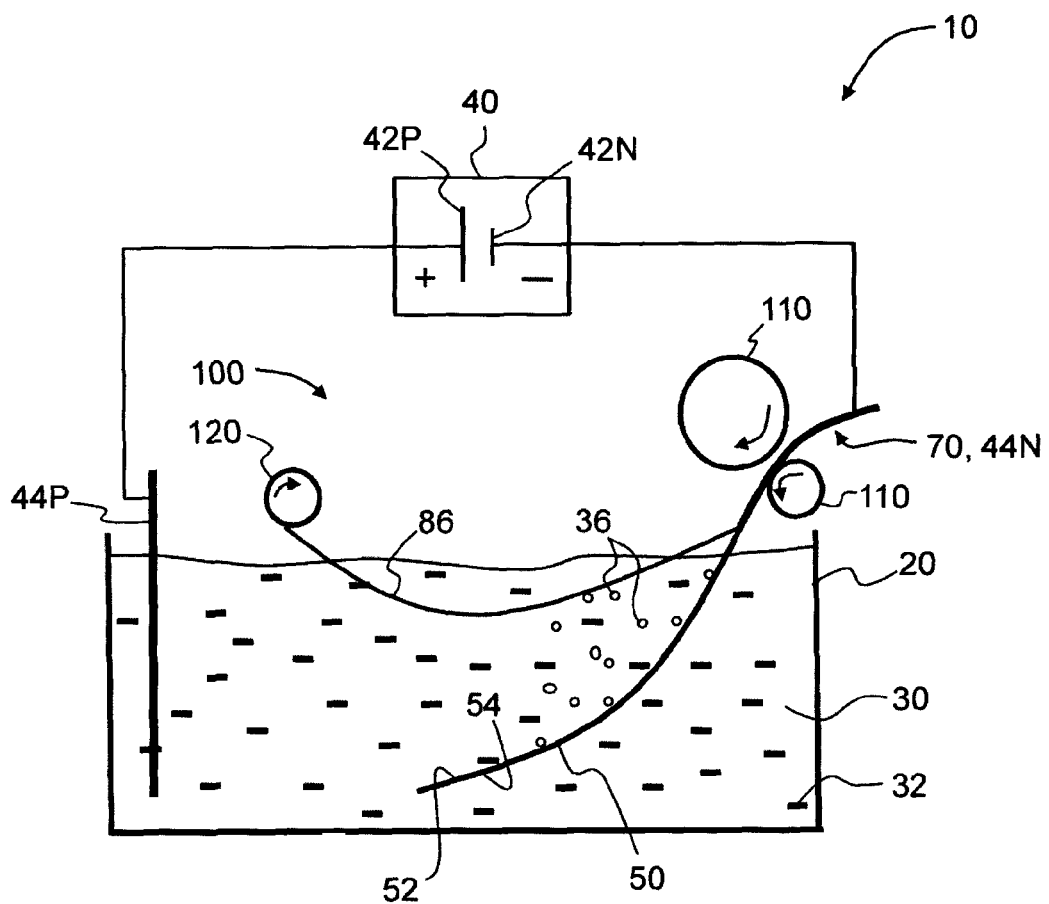
FIG. 1 is schematic diagram of an electrochemical apparatus suitable for carrying out the graphene delamination methods described herein.

FIG. 1 is a schematic of an electrochemical apparatus 10 suitable for carrying out the methods described herein. The electrochemical apparatus 10 includes a container 20 that contains an electrolytic solution 30 with ions 32. The electrolytic solution 30 may be an acidic solution, an alkaline solution, a neutral solution of organic or inorganic salt, a neutral inorganic and/or organic salt solution, or a conducting solvent solution. Examples of acid-based solutions include nitric acid, phosphoric acid, etc. Examples of alkali-based solutions include ammonia, water, etc. Examples of neutral inorganic or organic solutions include peroxydisulfate, nitrate, sulfate, organic ammonia, etc. Examples of conducting green solvent solutions include an ionic liquid, a molten salt, etc.

The electrochemical apparatus 10 includes an electrical potential source 40 (e.g., a battery, power supply, etc.) having a positive (+) lead 42P and a negative (−) lead 42N. The positive lead 42P is electrically connected to a positive electrode (anode) 44P that resides within electrolytic solution 30. The negative lead 42N is electrically connected to a metal substrate 50, which makes the metal substrate serve as a cathode for reasons discussed in greater detail below.

Figure 2A:
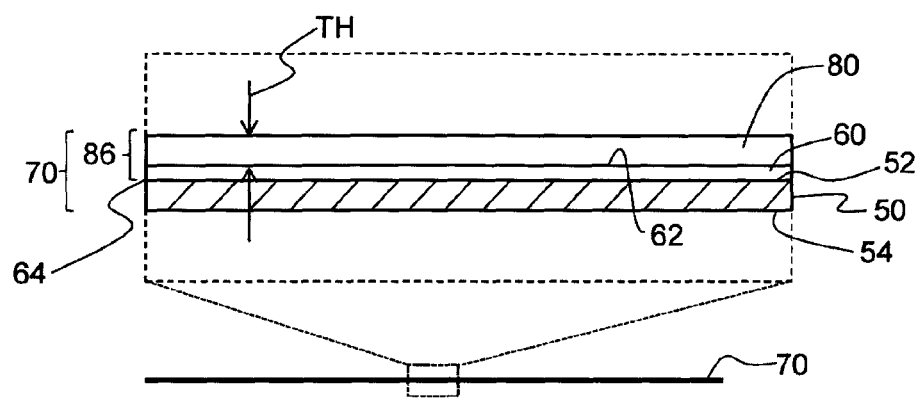
FIGS. 2A and 2B are side views and close-up inset views of examples of a graphene-metal (G-M) structure, with FIG. 2A showing an example G-M structure having a single graphene film and support layer and FIG. 2B showing an example two-sided G-M structure having two graphene films and corresponding support layers.
Figure 2B:
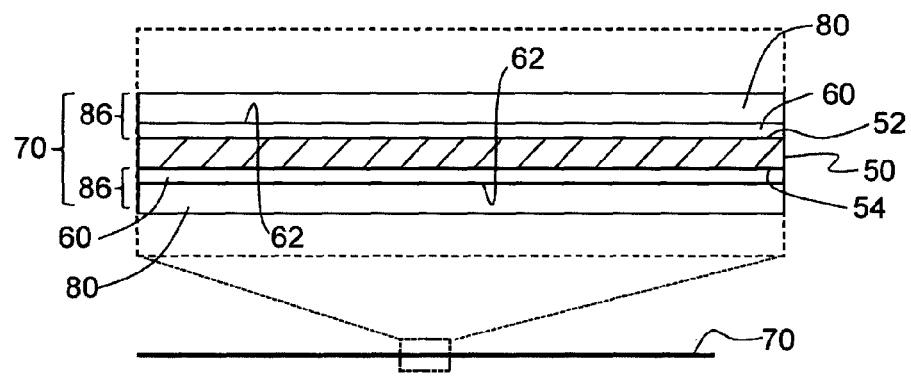

With reference also to FIGS. 2A and 2B, metal substrate 50 has top and bottom surfaces 52 and 54, with at least one of these surfaces supporting a graphene (G) film 60. The graphene film 60 has an exposed surface 62 on the side opposite the one in immediate contact with metal substrate 50.

The metal substrate 50 and graphene film 60 define a graphene-metal (G-M) structure 70 (a "first structure") that includes a metal-film interface 64. The electrochemical apparatus 10 is used to process the G-M structure 70 in order to exfoliate graphene film 60 from metal substrate 50 while substantially preserving the metal substrate, as discussed below. The metal substrate 50 may be in the form of a thin foil. The metal substrate 50 serves as a catalyst for the growth of graphene thereon. The example G-M structure 70 shown in FIG. 1 has graphene film 60 formed on top surface 52 of metal substrate 50.

The graphene film(s) 60 may be formed by chemical vapor deposition (CVD), inductively coupled plasma chemical vapor deposition (ICP-CVD), epitaxial growth, ion sputtering, mechanical compression in a layer structure or any other currently known or later developed methods. Example metals for use as metal substrate 50 include copper (Cu), nickel (Ni), platinum (Pt) and iridium (Ir), though any metal suitable for supporting the formation of graphene film 60 and that can serve as a cathode in electrochemical apparatus 10 can be employed.

In the exfoliation process discussed below, metal substrate 50 serves to support graphene film 60 and as noted above also serves as an electrode (cathode) for an electrochemical reaction in electrochemical apparatus 10. In an example, metal substrate 50 has a metal layer structure, which may be produced by sputter and/or E-beam deposition or by mechanically laminating metal onto a foil. An exemplary metal substrate 50 is thin, i.e., is a foil. An exemplary metal foil is copper.

In the example illustrated in FIG. 2A, G-M structure 70 includes a support layer 80 that resides on graphene film 60 opposite metal substrate 50 (i.e., resides immediately adjacent graphene film surface 62). The support layer 80 may be formed by spin coating or by any other deposition method known in the art. The combination of support layer 80 and graphene film 60 define an SL-G structure 86 (a "second structure") that has greater mechanical strength than has the graphene film alone. The support layer 80 can be made of a polymer (e.g., poly(methyl methacrylate) (PMMA)), a metal (e.g., Au) or a non-metal (e.g., Si). The G-M structure 70 can thus have a configuration that can be described as "SL-G-M", where "SL" stands for support layer 80.

The graphene film 60 may be formed on one or both of metal substrate surfaces 52 and 54. FIG. 2B is similar to FIG. 2A and illustrates an example G-M structure 70 that includes graphene films 60 formed on top and bottom surfaces 52 and 54 of metal substrate 50, with support layers 80 formed on each of the graphene films. This particular G-M structure 70 has a configuration that can be described as SL-G-M-G-SL.

The support layer 80 has a thickness TH (see FIG. 2A). This thickness TH can be adjusted as support layer 80 is being deposited or otherwise arranged on graphene film 60. For the example where support layer 80 is formed from a spin-coated polymer, the thickness TH of the polymer layer can be defined by selecting a suitable spin speed for the polymer spin coating process.

With reference again to FIG. 1, electrochemical apparatus 10 includes a roller system 100 that includes one or more input rollers 110 and a take-up roller 120. The input rollers 110 receive G-M structure 70 and lead it into electrolytic solution 30 so that at least a portion of the G-M structure is immersed therein. In an example, roller system 100 is configured to be auto-tensioning. As discussed above, negative lead 42N is electrically connected to metal substrate 50, which then serves as the cathode in electrochemical apparatus 10.

Figure 3:
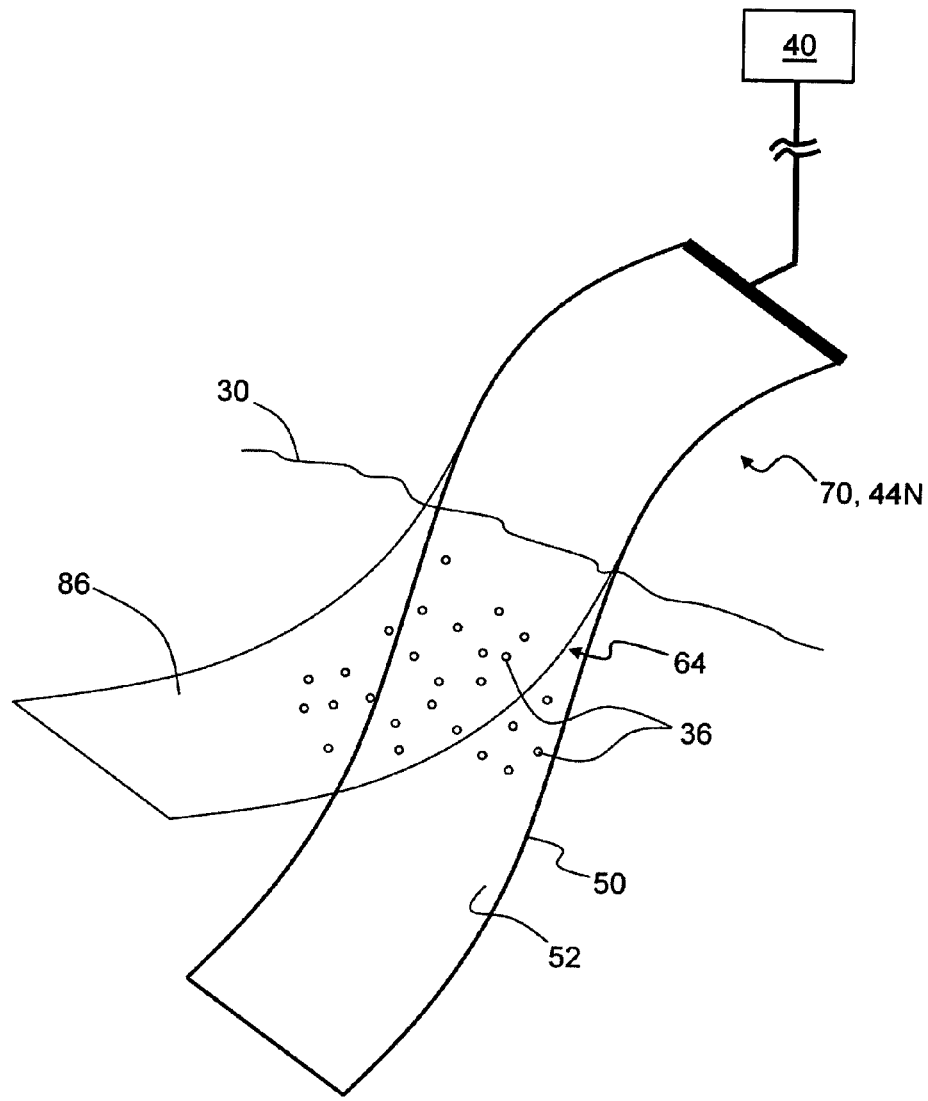
FIG. 3 is a schematic close-up, elevated view of the G-M structure being delaminated to peel off the support layer and graphene (SL-G) structure.

With reference also to the close-up view of FIG. 3, the electrochemical reaction in electrochemical apparatus 10 causes the water in electrolytic solution 30 to undergo hydrolysis, which creates small gas (hydrogen) bubbles 36 at the metal-film interface 64. The gas bubbles 36 provide a gentle force that causes graphene film 60 to cleave away from top surface 52 of metal substrate 50, with SL-G structure 86 eventually peeling off of the metal substrate. For the two-sided configuration of G-M structure 70 shown in FIG. 2B, gas bubbles 36 may form at the two metal-film interfaces 64.

As SL-G structure 86 slowly peels away from metal substrate 50, it is taken up by take-up roller 120, while the metal substrate remains substantially preserved. The metal substrate 50 is then recovered and retained for subsequent cycles of graphene film growth and exfoliation. As mentioned above, recycled metal substrate 50 can have improved surface(s) that aid in the formation of higher-quality graphene film 60 than can be formed on a new metal substrate.

Figure 4:
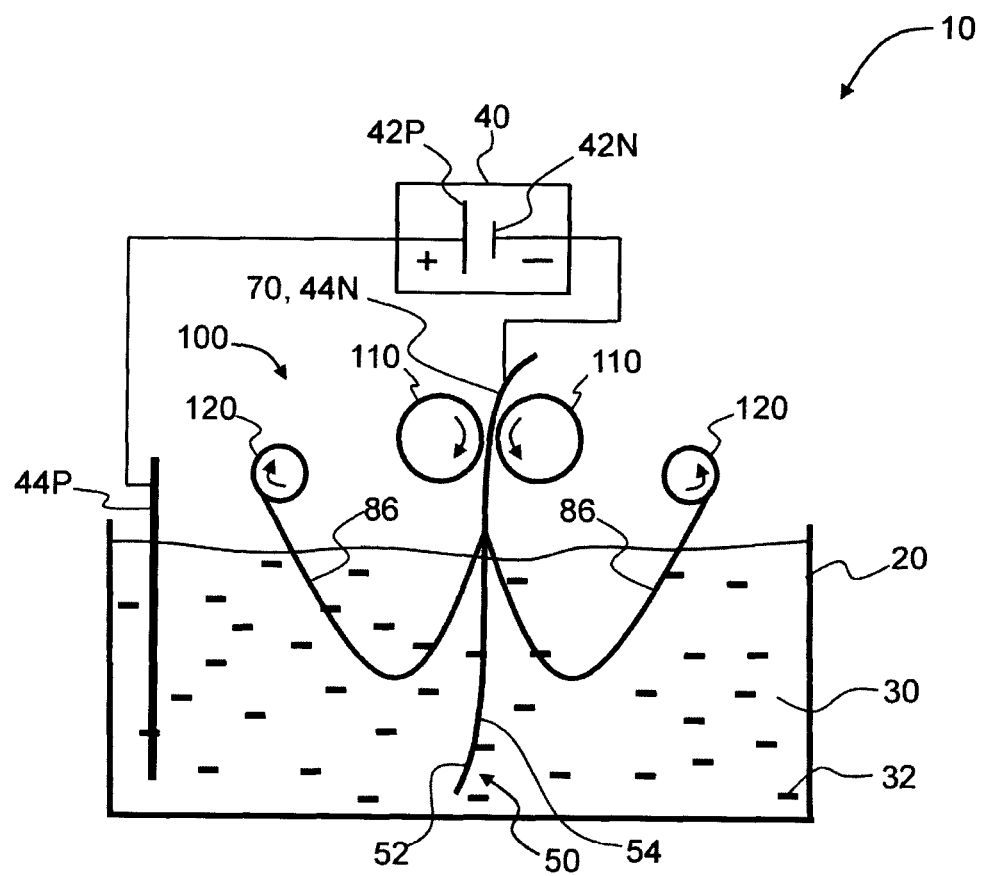
FIG. 4 is similar to FIG. 1 and shows a modified electrochemical apparatus suitable for carrying out the methods of the disclosure for a two-sided G-M structure such as the one shown in FIG. 2B.

FIG. 4 is similar to FIG. 1 and illustrates an alternative example of electrochemical apparatus 10 for processing the SL-G-M-G-SL form of G-M structure 70 of FIG. 2B. The electrochemical apparatus 10 includes an extra take-up roller 120 so that the two SL-G structures 86 are taken up by respective take-up rollers 120.

In experiments, a large-area graphene film 60 was produced on a metal substrate 50 made of copper using a CVD growth process carried out in a quartz tube at reduced pressure. The metal substrate 50 was in the form of a copper foil having a thickness of 25 μm and a purity of 99.999%. The copper foil was pretreated at 1,000° C. for 30 min under a combined flow of $Ar:H_2=50:10$ to obtain copper crystals with a larger grain size. Afterward, the Ar gas was replaced by high-purity methane (99.999%). A gas mixture of $CH_4$ (110 sccm) and $H_2$ (10 sccm) was then used for the growth of graphene at about 5.0 Torr. After 30 min of growth, the CVD system was cooled down to room temperature under $H_2$.

The support layer 80 of poly(methyl methacrylate) (PMMA) (MicroChem Corp. 495 PMMA A5, 5% in anisole) was deposited on G-Cu structure (sample) 70 by spin coating at 3,000 rpm for 30 seconds. The resulting G-Cu structure 70 (i.e., the PMMA-G-Cu sample) was annealed at 90° C. for 3 min. This Gu-C sample 70 was then employed to serve as a cathode 44N in electrochemical apparatus 10. The electrical potential source 40 was in the form of a direct-current (DC) power supply (TEXIO, PD110-5AD). The glassy carbon working electrode 44P (Part Number: CHI 104, CH Instruments, Inc.) was also employed. Other materials can be used for anode 44P, such as platinum (Pt), copper, silver and the like.

At cathode 44N, there are two competing reactions when the voltage is increased to a suitable level (e.g., 5 V). The electrolytic solution 30 used in the example electrochemical process was a $K_2S_2O_8$ solution, with 5 g of $K_2S_2O_8$ dissolved in 1 L of DI-water.

The copper foil is slightly etched according to the reaction:

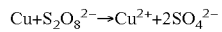

$$Cu+S_2O_8^{2-} \rightarrow Cu^{2+}+2SO_4^{2-}$$

The etched copper, in the form of copper ions, is then reduced back to Cu metal at cathode 44N by the reaction:

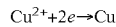

$$Cu^{2+}+2e \rightarrow Cu$$

At the same time, the cathodic reduction of hydrogen ions to hydrogen gas occurs and bubbles 36 are created at metal-film interface 64. The gas bubbles 36 provide the aforementioned gentle force to cause SL-G structure 86 to cleave away and then entirely peel off of the copper foil.

Figure 5A:
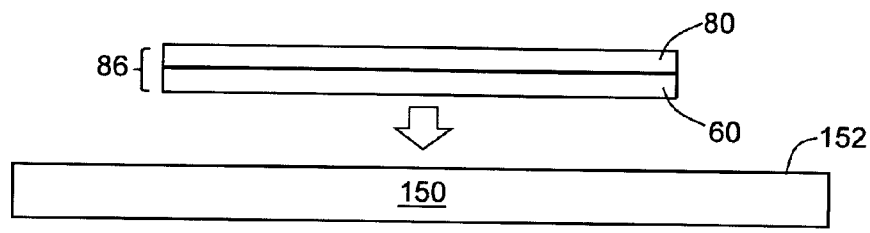
FIGS. 5A through 5C are schematic side views that illustrate an example of how the graphene film of the SL-G structure can be transferred to a processing (target) substrate.
Figure 5B:
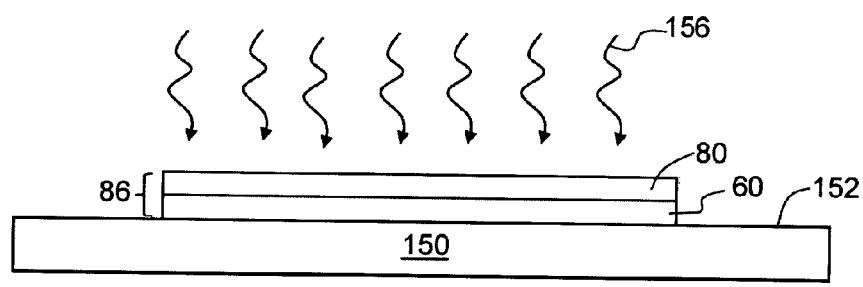
Figure 5C:
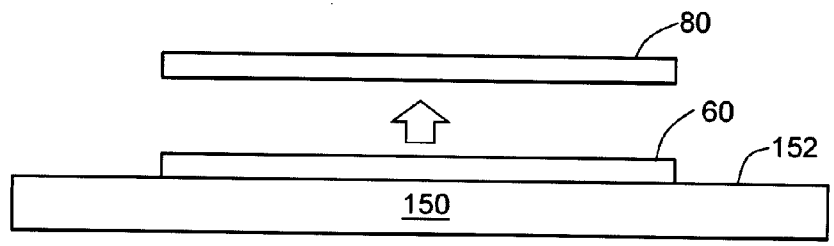

Once SL-G structure 86 has peeled away from metal substrate 50 (and been collected, such as on take-up roller 120), it can be transferred onto a processing (target) substrate 150 having a top surface 152. FIGS. 5A through 5C are side views that schematically illustrate an example of this aspect of the method. In FIG. 5A, SL-G structure 86 is applied to surface 152 of process substrate 150, with graphene film 60 contacting the surface of the process substrate. In FIG. 5B, the resulting structure is optionally heated (e.g., annealed) with heat 156 to facilitate the transfer process. In experiments, SL-G structures 86 were placed on process substrates 150 and annealed at 90° C. for 5 min to allow graphene film 60 to be sintered to the process substrate 150.

With reference to FIG. 5C, support layer 80 is removed from graphene film 60. This can be accomplished using known techniques suitable for the particular support layer materials. In an example where support layer 80 is a PMMA layer, the support layer can be removed using acetone (e.g., by immersion in acetone overnight).

In one embodiment, support layer 80 is a thermal release tape that is attached to graphene film 60 by a roll-to-roll process. This facilitates the dry transfer of graphene film 60 by allowing the graphene film to air-dry after being removed from electrolytic solution 30 after the electrochemical exfoliation process once the electrochemical exfoliation process is complete but before being deposited onto process substrate 150. Other drying processes may also be used to remove water from graphene film 60 after removal from electrolytic solution 30.

For example, after growing graphene film 60 on metal substrate 50, support layer 80 in the form of thermal release tape is applied to surface 62 of the graphene film. An optional layer (~100 nm) of gold (not shown) may be deposited therebetween, using, for example, electron beam evaporation. Once graphene film 60 is successfully removed from metal substrate 50 using the electrochemical exfoliation methods disclosed herein, the thermal release tape may be applied on process substrate 150 (e.g., a silicon wafer) to facilitate the drying and transfer of the graphene film.

Thus, with continuing reference to FIGS. 5A-5C, upon transferring graphene film 60 to surface 152 of process substrate 150, the process substrate may be heated (e.g., to 120° C.) with heat 156, at which point the thermal release tape falls off, leaving the graphene film atop the process substrate (i.e., on the surface of the process substrate). In the example where the optional layer of gold is included on surface 62 of graphene film 60 prior to the application of support layer 80, the remaining layer of gold on top of the graphene film is removed using, for example, dry etching with an oxygen plasma followed by a wet etch with a gold etchant.

In another embodiment, support layer 80 may be a special polymer that acts as a transfer stamp. An example of such a polymer is polydimethylsiloxane (PDMS). The use of such a support layer 80 can facilitate the dry transfer of graphene film 60 and/or facilitate a secondary transfer. In this example, the PDMS is attached to G-Cu structure 70 to form a PDMS-G-Cu structure. After the electrochemical delamination process, the resulting SL-G structure 86 (i.e., the PDMS-G structure) is immersed in deionized (DI) water to dilute and remove the etchant and residues. The graphene film 60 is then transferred onto the desired process substrate 150. This can be accomplished, for example, by pressing the G-PDMS structure onto process substrate 150 at 90° C. for 15 min, and then removing the PDMS layer.

The methods disclosed here include forming multiple layers of graphene film 60 by repeatedly transferring different graphene films to surface 152 of process substrate 150, thereby forming a structure of multiple graphene thin film layers that is flexible, conductive, and transparent. This same method may be applied in the manufacture of other types of thin films on metal substrates.

An advantage of the methods disclosed herein is that metal substrates 50 can be reused (recycled). For example, the same copper foil can be used to grow and transfer graphene films 60 multiple times. Due to the fact that graphene film 60 is grown on surface 52 of metal substrate 50, the surface morphology of the metal substrate can have a substantial impact on the graphene film growth. Experiments were carried out using metal substrates 50 made of copper foil, where the change in the Cu surface was measured after each of three cycles of electrochemical delamination. In the first growth and electrochemical-delamination run, an inherent/existing terrace structure on surface 52 of the copper foil was used as a marker or reference to track the surface morphology before and after the exfoliation process. After the second and third runs, the copper surface grew increasingly and markedly smooth, which explains why repeated use of the metal substrate can lead to increasingly better quality graphene films 60.

Figure 6:
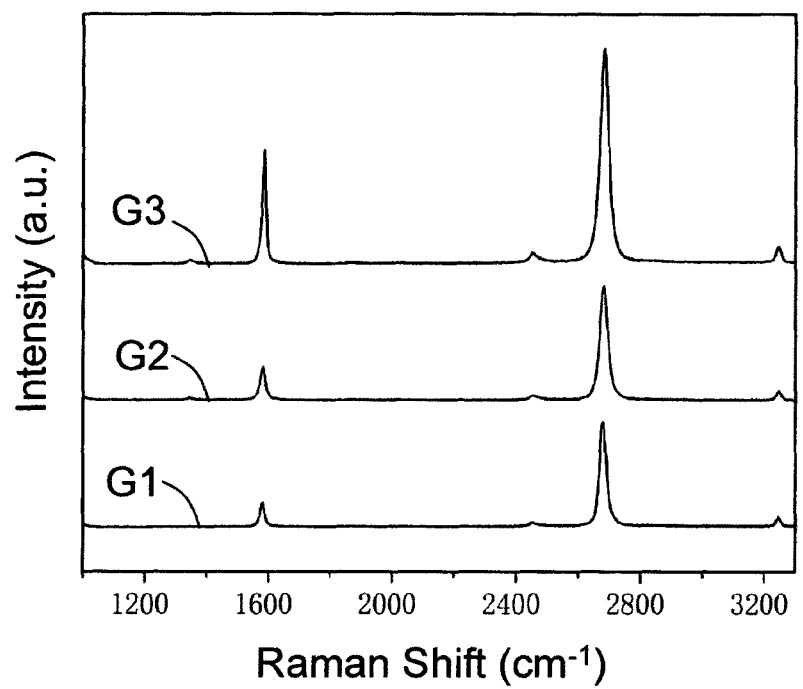
FIG. 6 is a plot of the intensity (arbitrary units, a.u.) vs. the Raman shift ($cm^{-1}$) that shows three graphene film samples G1, G2 and G3 formed on the same metal substrate in subsequent runs of the method, and shows how the graphene film quality improves when a recycled substrate is used.

FIG. 6 is a plot of intensity (arbitrary units, a.u.) vs. Raman Shift ($cm^{-1}$) for a Raman spectroscopy measurement made on three graphene films 60 formed as described above, and which are denoted as G1, G2 and G3 in the plot. The three graphene films G1-G3 were formed in three successive cycles of graphene-film growth on the same Cu foil followed by electrochemical etching. The Raman data in FIG. 6 shows increasing quality for the graphene films progressing from film G1 up to film G3. This indicates that the graphene film quality improves with the number of electrochemical exfoliation/peeling cycles when the same metal substrate is used to carry out the method. The electrochemical etching and re-deposition process apparently causes surface 52 of metal substrate 50 to be planarized, which leads to an improvement in the quality of the graphene film 60 grown in subsequent cycles or runs.

The support layer 80 is employed to improve the electrochemical peeling process because a bare graphene film 60 on a thin metal substrate 50 such as Cu foil cannot readily be electrochemically peeled off and remain intact as a continuous film when it is only bound on one side by the metal substrate. The support layer 80 helps to protect and maintain the structural integrity of graphene film 60 when it is being subjected to the agitation associated with bubbles 36 formed on metal-film interface 64.

Thus, support layer 80 acts as a scaffold on one side (i.e., the surface 62 side) of graphene film 60 so that the graphene film will not roll, tear or ripple up when it is being electrochemically peeled from metal substrate 50. In the absence of support layer 80, the graphene film 60 tends to break up into fragments due to the shear force of bubbles 36, and then roll up.

Figure 7:
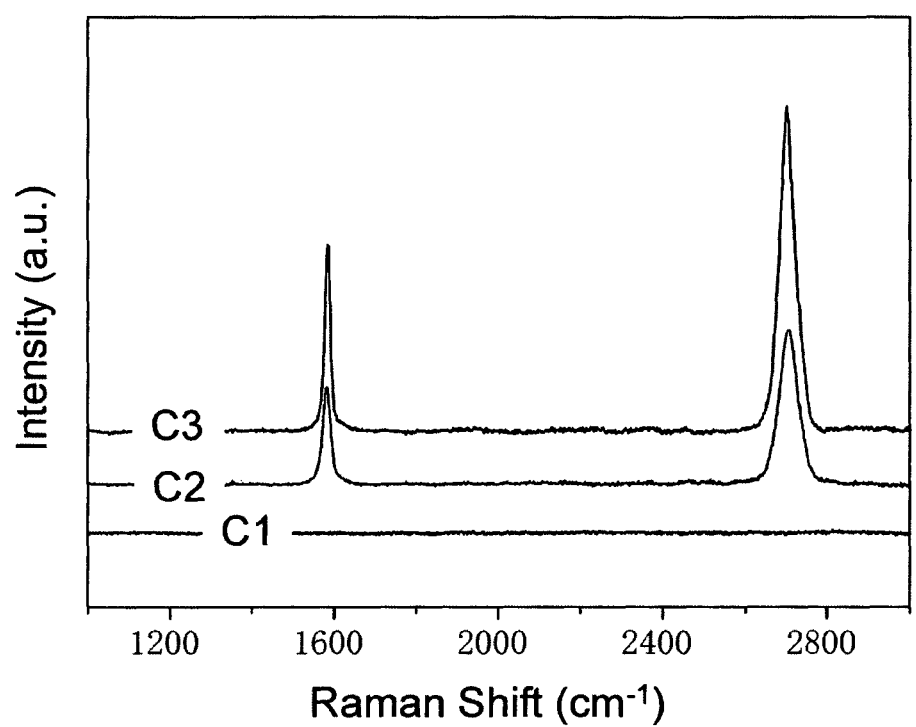
FIG. 7 is similar to FIG. 6 and shows the Raman spectra curves C1, C2 and C3 to illustrate the benefits of employing a support substrate as part of the delamination method.

FIG. 7 is a Raman spectra plot similar to FIG. 6, and shows three curves C1, C2 and C3. The curve C1 is a measurement of SL-G structure 86 with a PMMA-G configuration as formed by electrochemical peeling from a copper metal substrate 50. The curve C2 is a measurement of G-M structure 70 that has no PMMA support layer and that is prior to etching. The curve C3 is a measurement of the same G-M structure 70 of curve C2 but after etching.

From the Raman measurements of FIG. 7, it is observed that PMMA-G structure 86 can be peeled off completely by electrochemical delamination, as judged by the complete disappearance of characteristic graphene Raman peaks. However, the G and 2D peaks of graphene can be seen in curve C2 for the G-Cu structure 70 prior to electrochemical peeling. In comparison, the Raman-characterized peaks of PMMA-G structure 86 can be still found in curve C3 after the electrochemical delamination from the copper substrate. This indicates that the use of support structure 80 is advantageous in recovering graphene film 60 from metal substrate 50.

Figure 8:
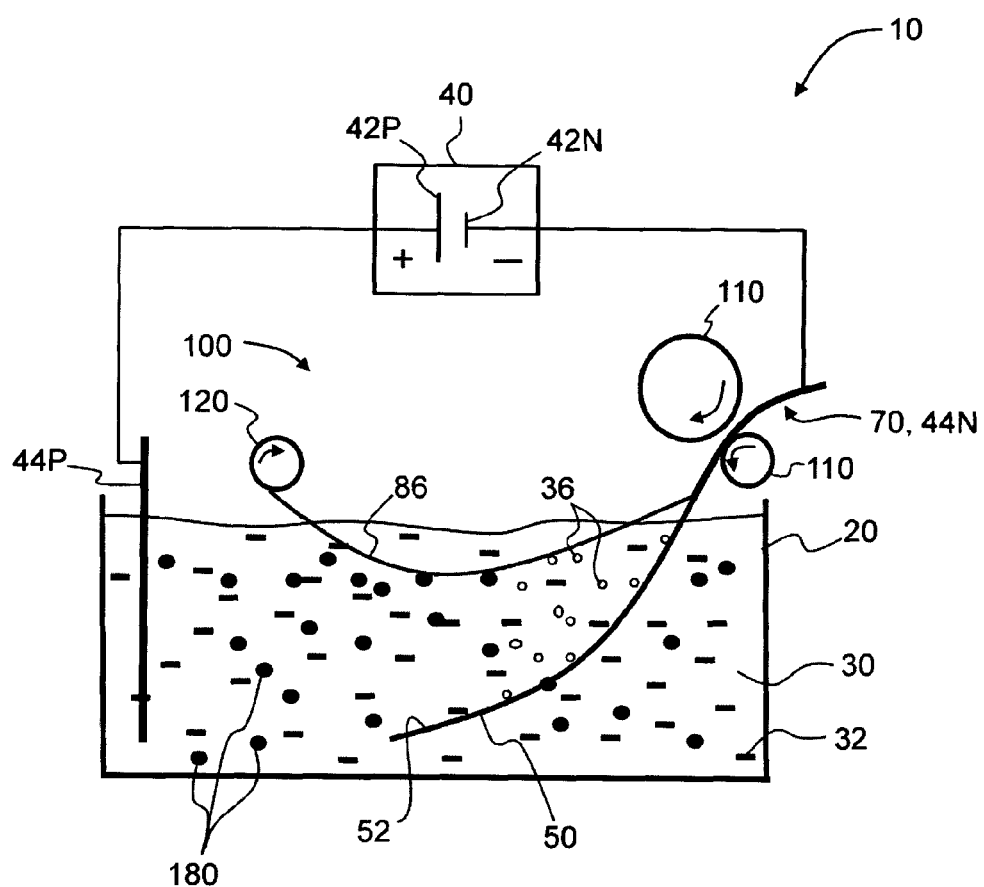
FIG. 8 is similar to FIG. 1 and illustrates the use of nanoparticles or nanocrystals in the electrolytic solution to form functionalized graphene.

FIG. 8 is a schematic diagram of electrochemical apparatus 10 similar to that shown in FIG. 1. The electrochemical apparatus 10 of FIG. 8 includes nanoparticles or nanocrystals 180 in electrolytic solution 30. The nanoparticles or nanocrystals 180 attach themselves to graphene film 60 as SL-G structure 86 separates from metal substrate 50 and is collected, e.g., on take-up roller 120 using a "roll-and-release" electrochemical peeling process. This aspect of the method allows for the formation of large-scale, functionalized graphene films 60 for use in a variety of applications, such as the formation of photovoltaic and electronics devices.

The electrochemical delamination methods disclosed herein are substantially more efficient than conventional methods. Using the methods disclosed herein, it takes only about 30 to 60 min to peel off a graphene film 60, whereas using conventional etching methods, it takes about 6 hours or more to dissolve metal substrate 50. Due to the non-destruction of metal substrates, the methods disclosed herein can be repeatedly used to grow graphene films, thereby reducing the material cost for the production of graphene and reducing the need for large volumes of chemical baths (electrolytic solutions).

What is claimed is:

1. A method of removing a graphene film grown on a surface of a metal substrate, comprising:
  applying a support layer to an exposed surface of the graphene film to define a first structure having a graphene-metal interface;
  subjecting the first structure to an electrochemical process that forms gas bubbles at the graphene-metal interface, thereby causing the graphene and support layer to separate from the surface of the metal substrate as a second structure while substantially preserving the metal substrate; and
  processing the second structure to remove the support layer from the graphene film.

2. The method according to claim 1, further comprising forming the graphene film on the surface of the metal substrate using a chemical vapor deposition process.

3. The method according to claim 1, wherein the metal substrate is made of either copper (Cu), nickel (Ni), platinum (Pt) or Iridium (Ir).

4. The method according to claim 1, further comprising collecting the second structure using a take-up roller.

5. The method according to claim 1, wherein the metal substrate has previously been subjected to the electrochemical process.

6. The method according to claim 1, further comprising:
  immersing the first structure in an electrolytic solution;
  using the metal substrate as a cathode that is paired with an anode that is also immersed in the electrolytic solution; and
  providing an electrical potential between the cathode and the anode to effectuate the electrochemical process.

7. The method according to claim 6, wherein the electrolyte solution includes an acid solution, an alkaline solution, a neutral inorganic solution, an organic salt solution, a combined neutral inorganic and organic salt solution, or a conducting green solvent solution.

8. The method according to claim 6, wherein the electrolytic solution includes nanoparticles or nanocrystals.

9. The method according to claim 1, further comprising:
applying the second structure to a process substrate; and
removing the support layer from the graphene film of the second structure, thereby leaving the graphene film on the process substrate.

10. The method according to claim 9, further comprising heating the second structure after it is applied to the process substrate.

11. The method according to claim 1, where the support layer is formed from a polymer, a metal or a non-metal.

12. The method according to claim 1, wherein the metal consists of copper and the support layer consists of poly (methyl methacrylate) (PMMA).

13. A method of removing a first graphene film from a first surface of a metal substrate on which the first graphene film has been formed, the method comprising:
   a) adding a first support layer to the first graphene film to form a first structure having an interface between the first graphene film and the first surface of the metal substrate;
   b) immersing at least a portion of the first structure in an electrolytic solution while using the first structure as a cathode, and including employing an anode in the electrolytic solution; and
   c) performing an electrochemical reaction by establishing an electrical potential between the anode and cathode through the electrolytic solution to cause the first graphene film and the first support layer to delaminate as a second structure from the first surface of the metal substrate while substantially preserving the metal substrate.

14. The method according to claim 13, wherein the electrolytic solution includes water and wherein the electrochemical reaction causes gas bubbles from the electrolysis of water to be generated at the interface, thereby causing said delamination of the second structure from the first structure.

15. The method according to claim 13, wherein the metal substrate has a second surface and the first structure includes a second graphene film on the second surface, and including a second support layer on the second graphene film to define another second structure, and wherein the electrochemical reaction delaminates both of the second structures from the metal substrate.

16. The method according to claim 13, further comprising collecting the second structure using a roll-and-release process.

17. The method according to claim 13, further comprising:
applying the second structure to a process substrate; and
removing the first support layer from the first graphene film of the second structure, thereby leaving the first graphene film on the process substrate.

18. The method according to claim 13, further comprising:
recovering the metal substrate;
forming another first graphene film on the first surface of the recovered metal substrate; and
performing acts a) through c) on the another first graphene film and the recovered metal substrate.

19. The method according to claim 13, where the first support layer is formed from a polymer, a metal or a non-metal.

20. The method according to claim 13, wherein the electrolytic solution comprises an acid solution, an alkaline solution, a neutral inorganic solution, an organic salt solution, a combined neutral inorganic and organic salt solution, or a conducting green solvent solution.

21. The method according to claim 20, wherein the metal substrate is made of copper, and wherein the electrolytic solution includes $K_2S_2O_8$.

22. The method according to claim 13, wherein the metal substrate comprises a thin metallic foil.

23. The method according to claim 13, further comprising forming the first graphene film on the first surface of the metal substrate using a chemical vapor deposition process.

24. The method according to claim 13, wherein the first support layer comprises either a thermal release tap or polydimethylsiloxane (PDMS).

* * * * *